Dec. 5, 1950 T. A. GUILD 2,532,904
CANE HARVESTING MACHINE
Filed Jan. 25, 1946 9 Sheets-Sheet 1
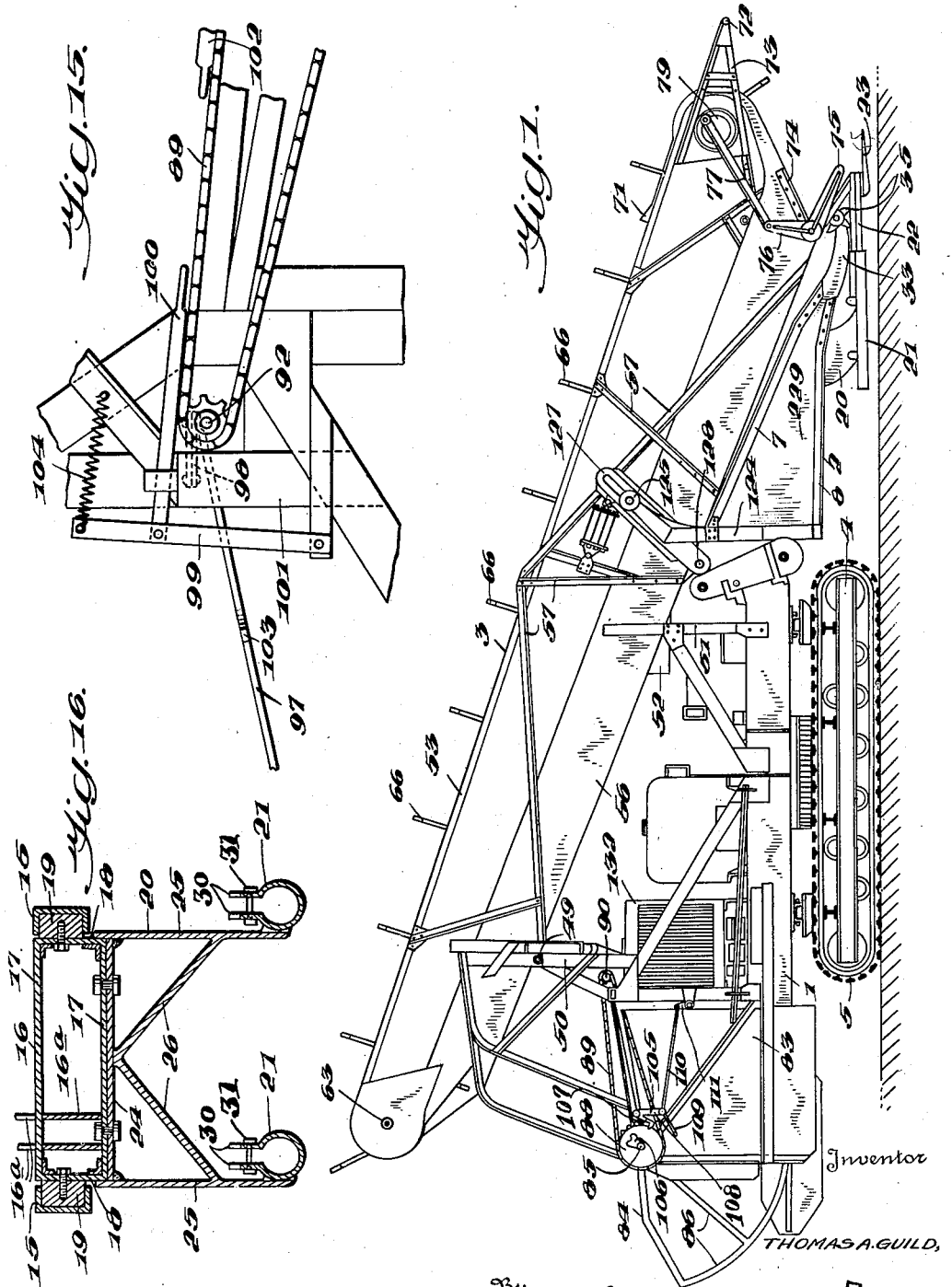
Inventor
THOMAS A. GUILD,
By Ritter, Mechlen & Muris
his Attorneys

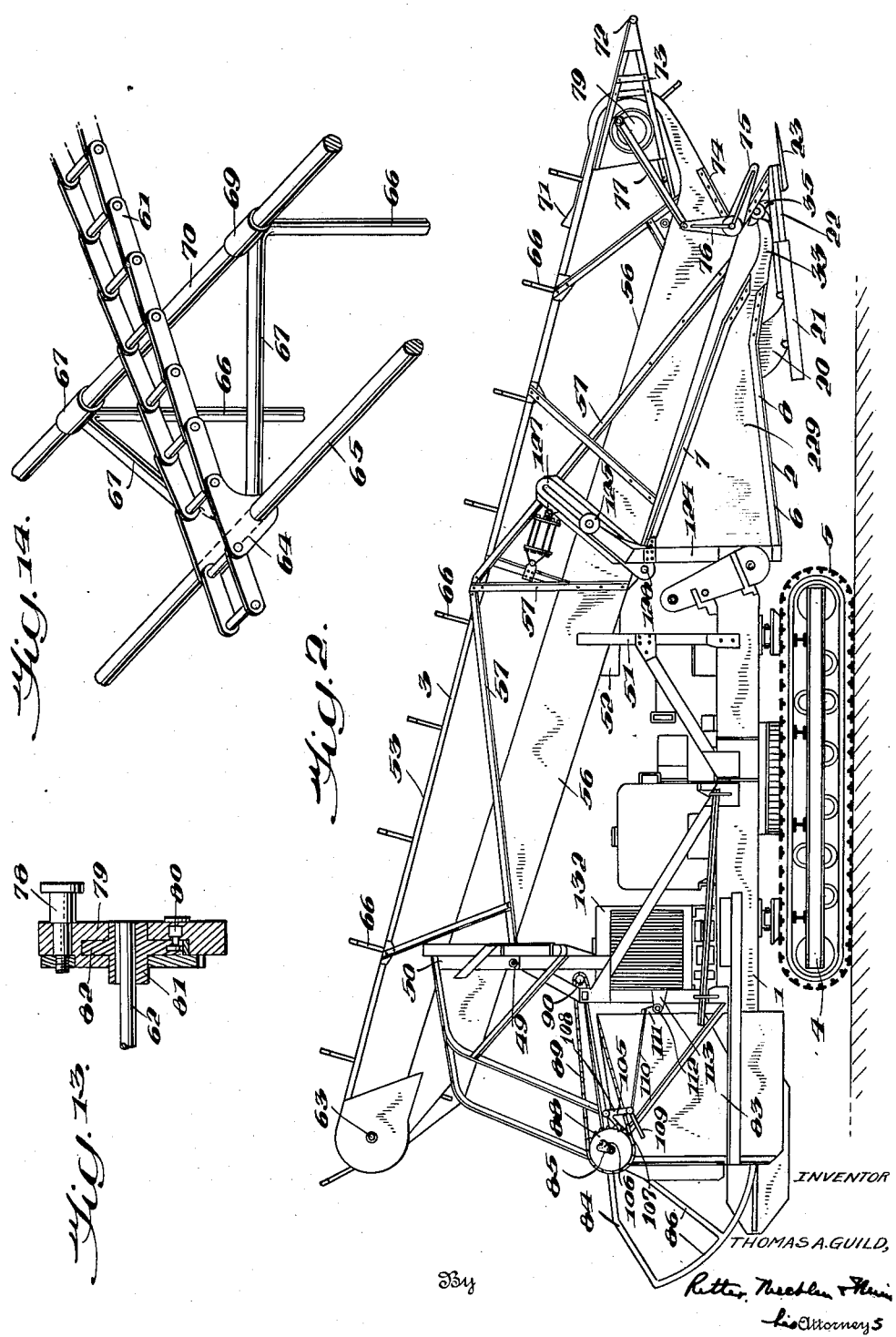

Dec. 5, 1950 T. A. GUILD 2,532,904
CANE HARVESTING MACHINE
Filed Jan. 25, 1946 9 Sheets-Sheet 3
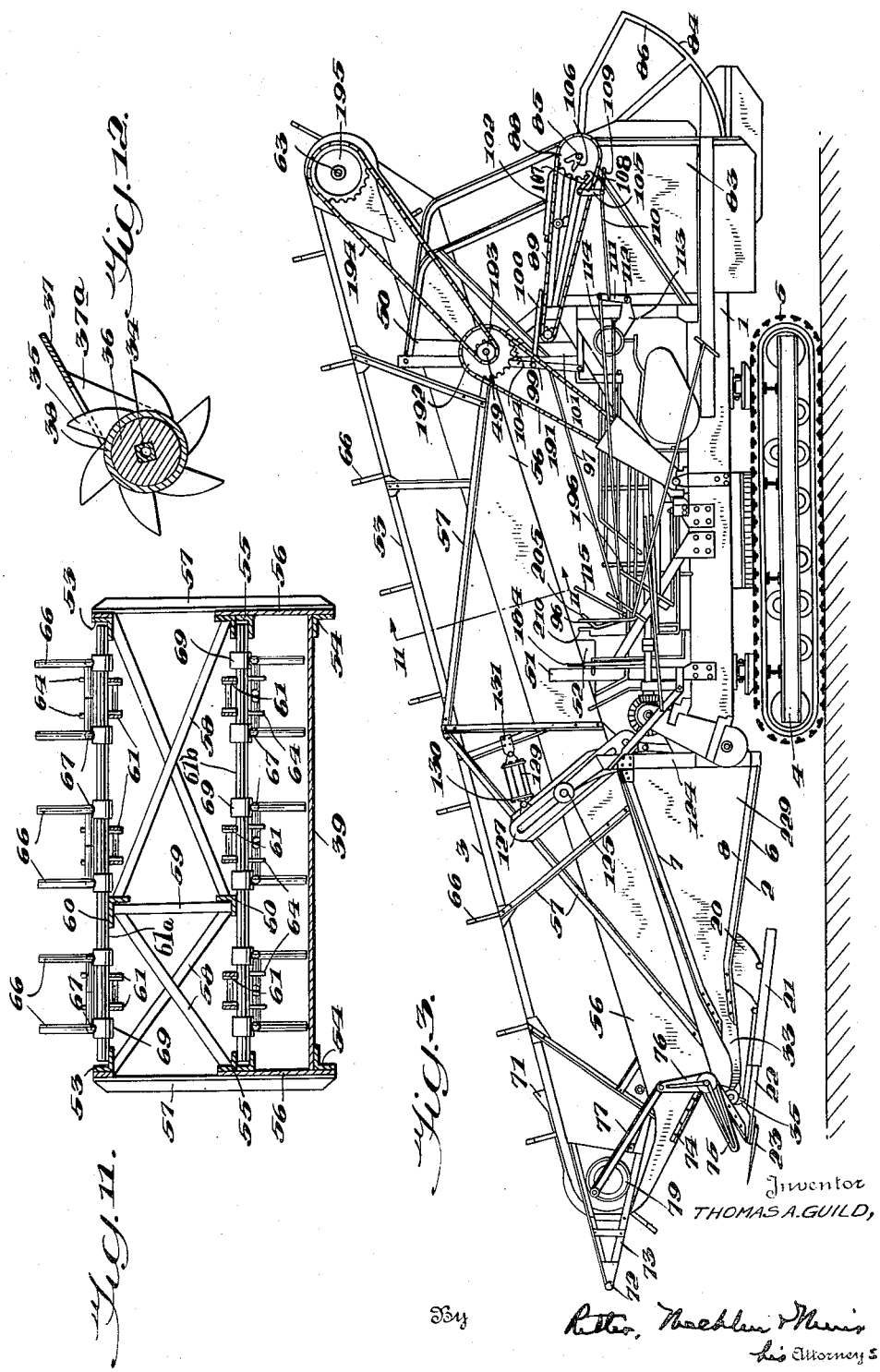
Inventor
THOMAS A. GUILD,
By his Attorneys

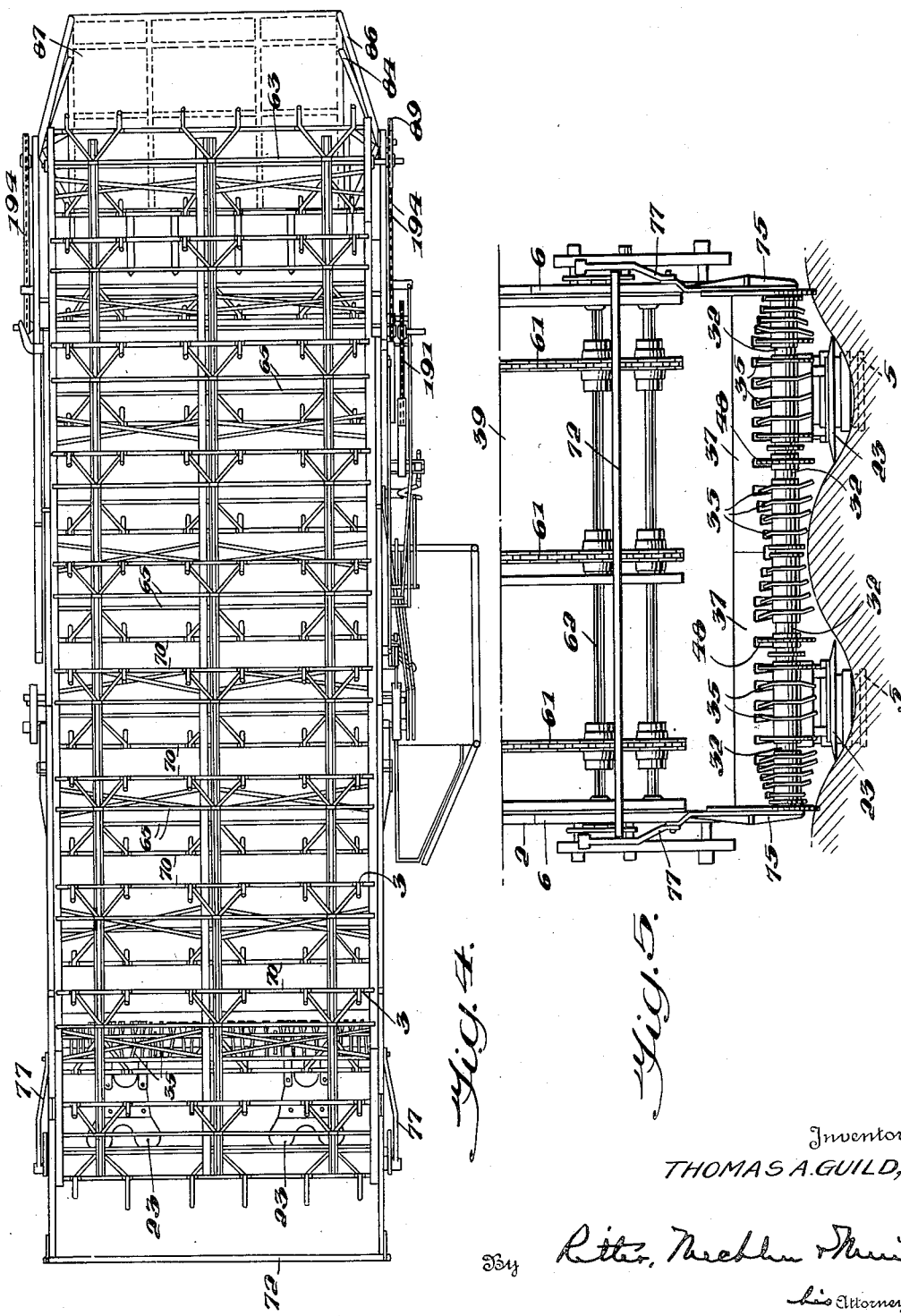

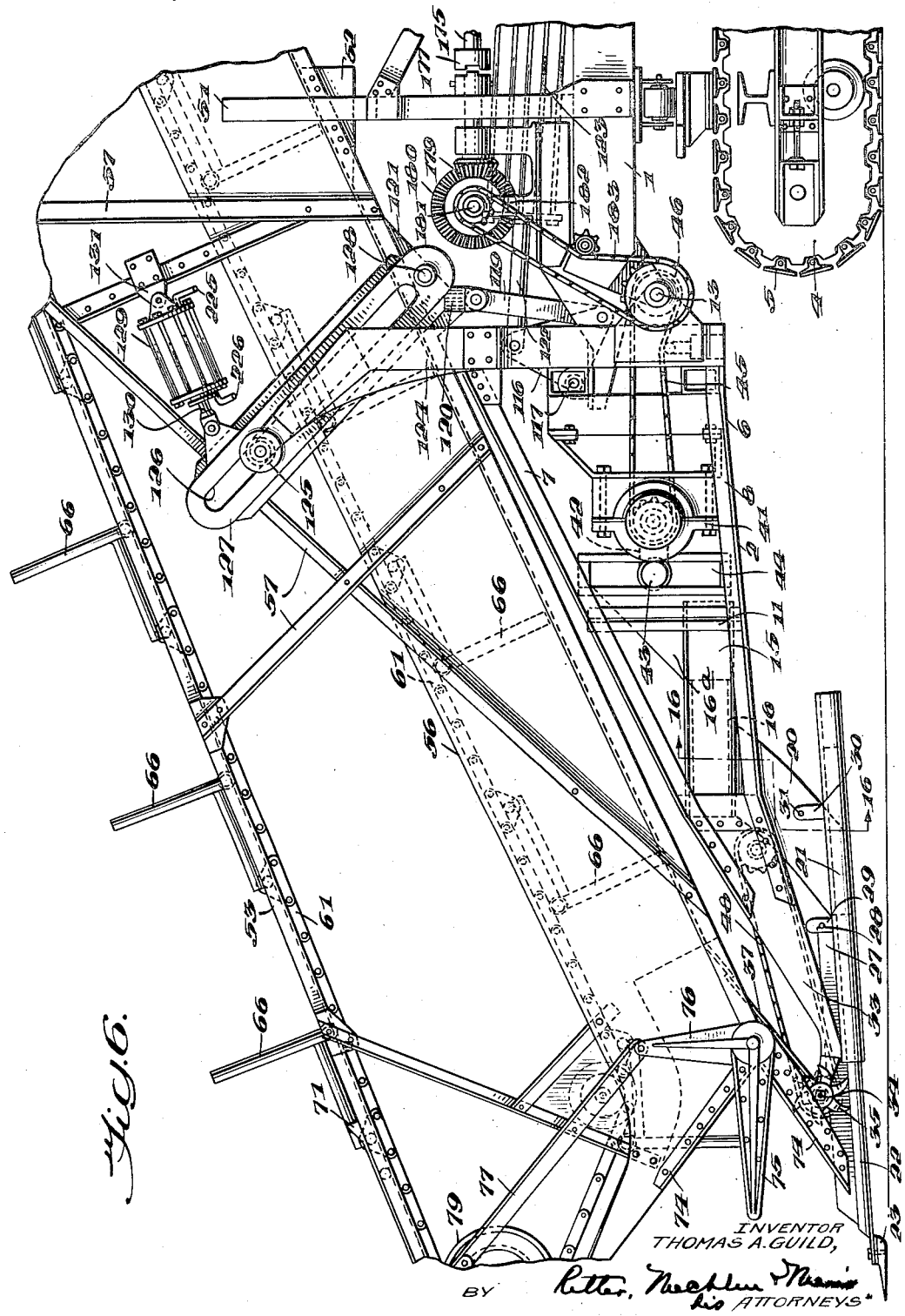

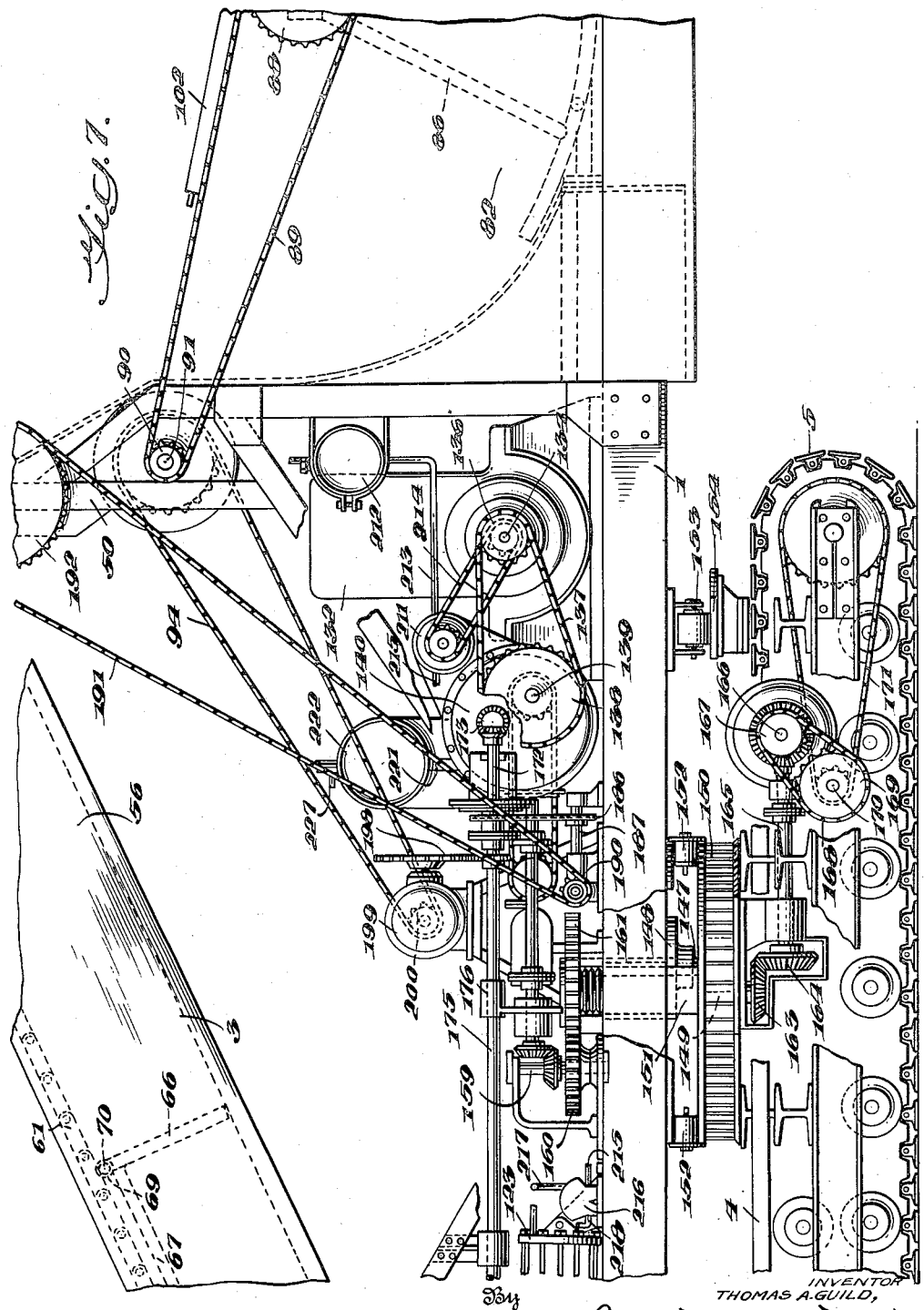

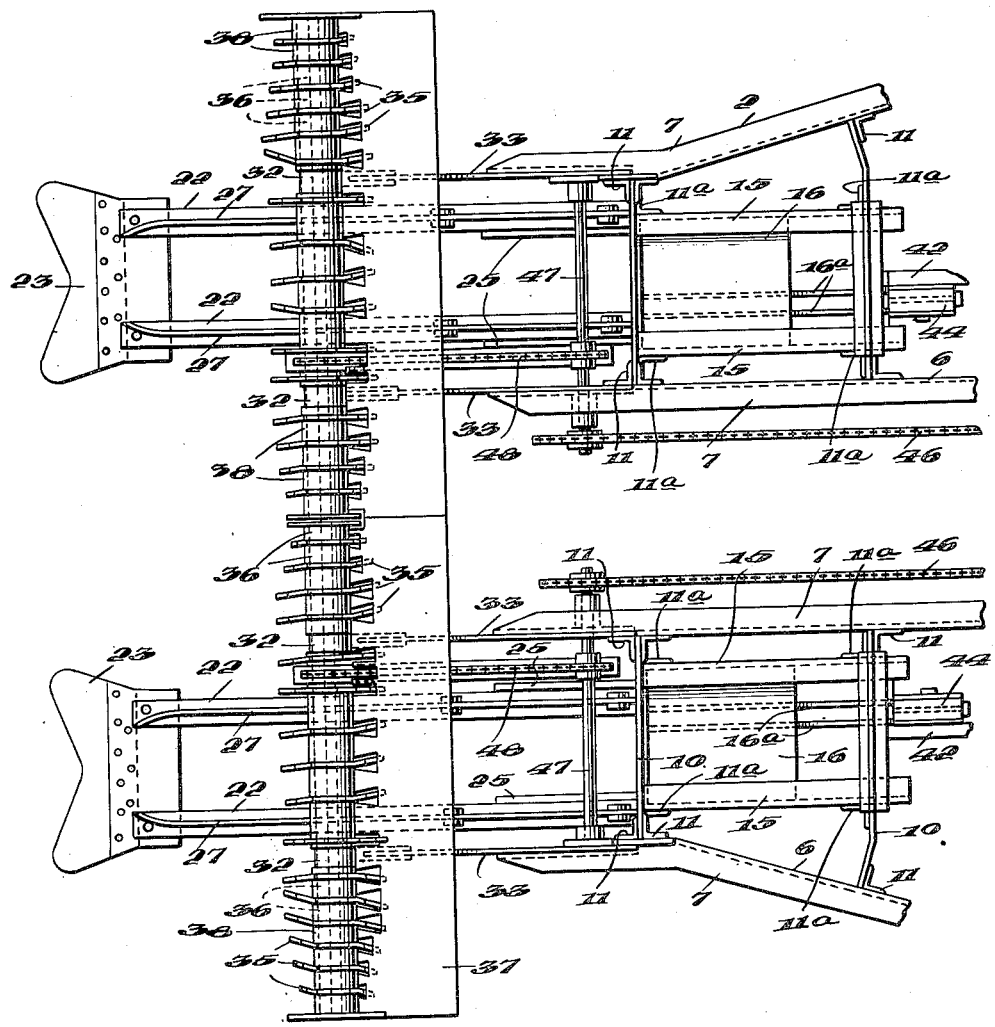

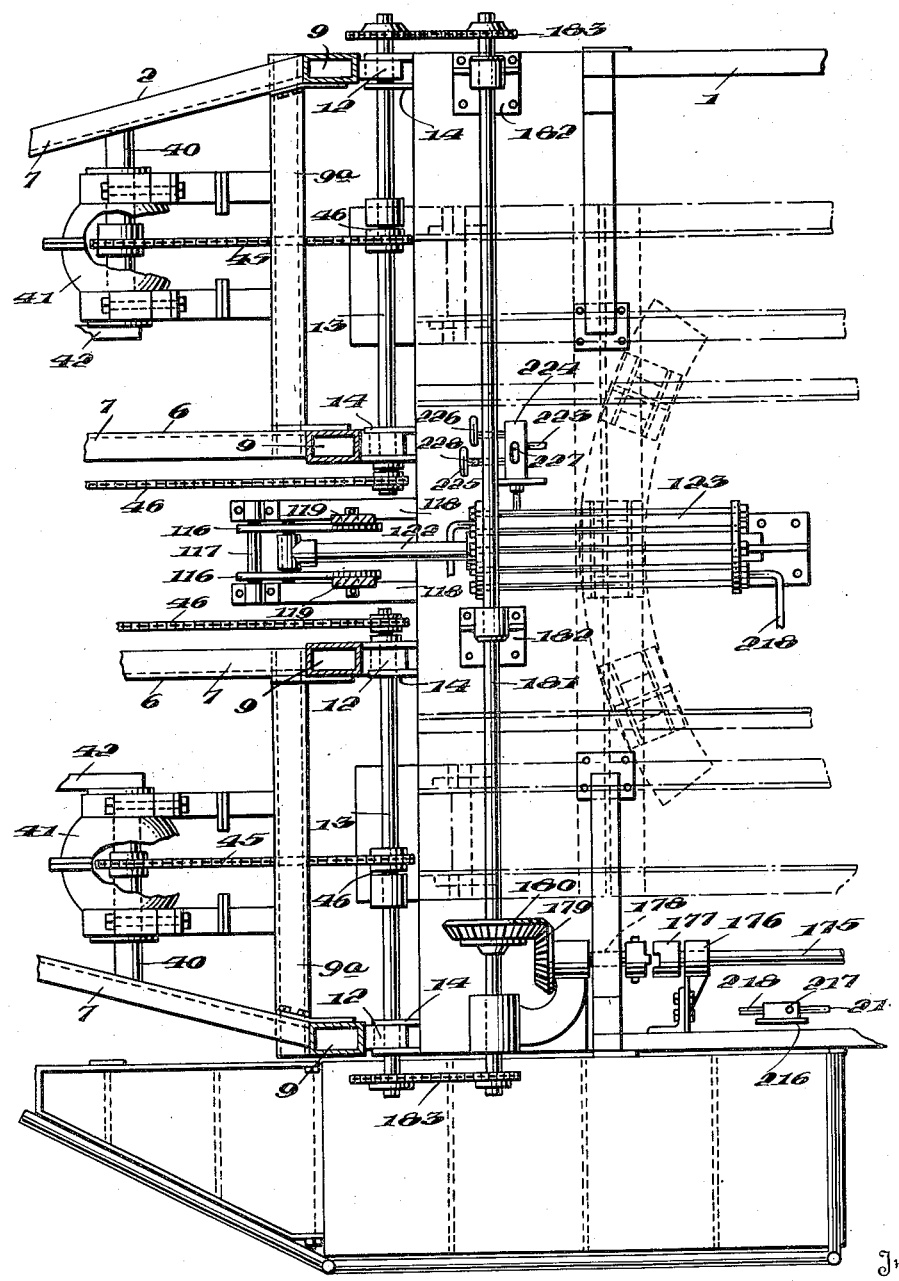

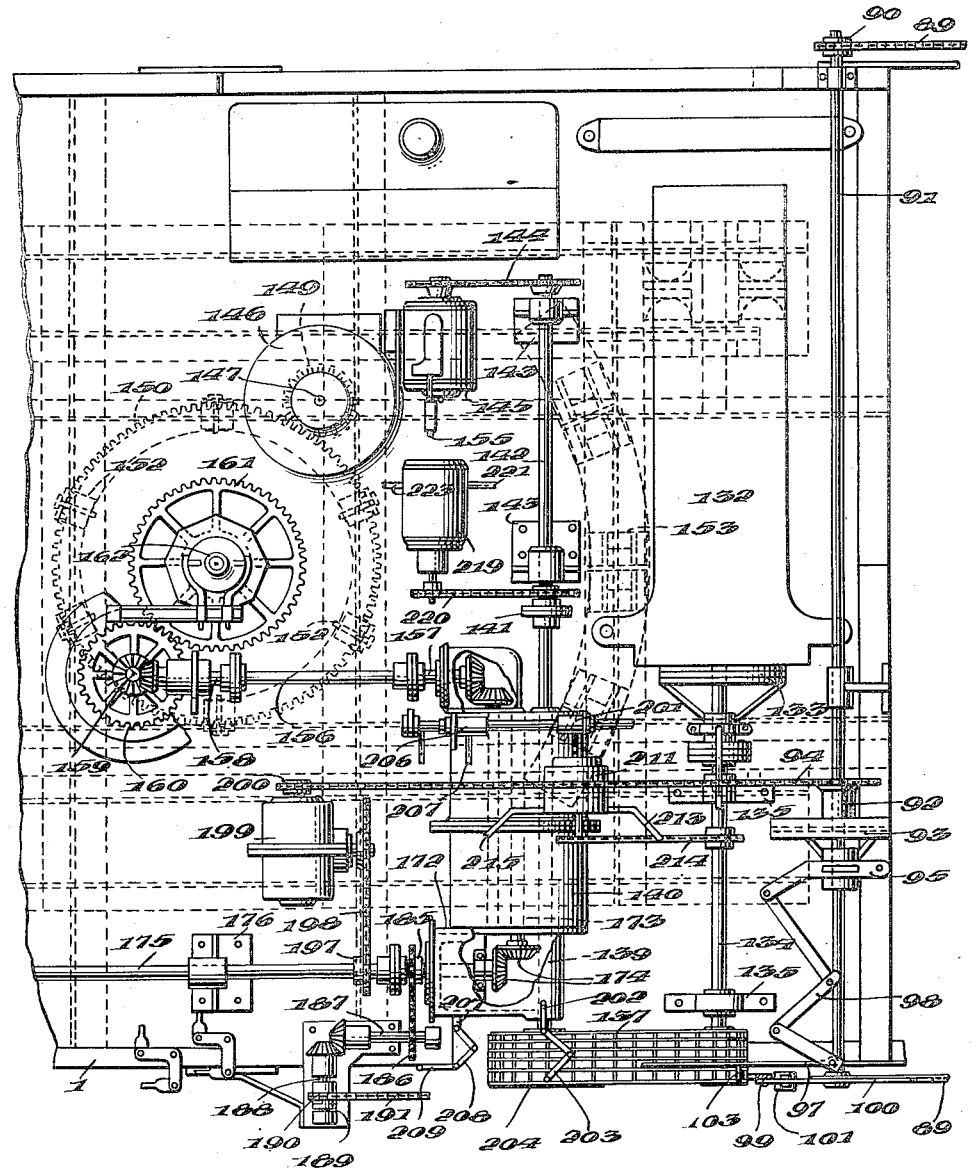

Patented Dec. 5, 1950

2,532,904

UNITED STATES PATENT OFFICE 2,532,904

CANE HARVESTING MACHINE

Thomas A. Guild, Waipahu, Territory of Hawaii

Application January 25, 1946, Serial No. 643,324

20 Claims. (Cl. 56—17)

My invention relates to cane harvesting machines and its principal object is to provide a practical harvester capable of cutting a plurality of rows of cane at one time and depositing the cut cane on the ground in heaped piles out of the path of movement of the harvester.

This application is a continuation in part of my application Serial No. 513,274, filed December 7, 1943, now abandoned.

In the two years which usually elapse from the time sugar cane seed is planted in Hawaii until the cane is ready for harvesting, the stalks grow on an average of about sixteen feet in length. Due to their length and consequent weight, the cane stalks seldom remain in an upright position while growing but, on the contrary, they bend down and grow along the ground. When ready for harvesting, it is customary that approximately two-thirds of each stalk is lying on the ground and only the remaining one-third or top end of the stalk is upright. The result is that by the time of harvesting, the stalks are in a tangled interlocked mass most of which is lying on the ground and, since the average yield of newly planted sugar cane is approximately one hundred tons per acre, the cane stalks are so thoroughly tangled and interlocked as to form, in effect, a matted blanket.

Various machines have heretofore been devised for harvesting cane but, because of the tangled condition into which it grows and the consequent severe service conditions under which the machines must be operated, no one of them, even the most complicated, has been successful in operation.

I have found that the cane can be successfully cut and then elevated to a desired point of discharge out of the path of the advancing harvester if no attempt is made to disarrange the stalks by either pulling or pushing on them. By my invention, a swath of cane is cut not only from the ground, but also from cane at the side of the swath, and the blanket of cut cane is transferred to a forwardly advancing, upwardly and rearwardly extending incline of the harvesting machine and elevated thereby without disturbing its tangled condition for discharge at the rear of the machine. One of the most important objects of the invention, therefore, is to cut the cane and permit it to move rearwardly relatively to the harvesting machine without pushing or pulling on the cane so as to thereby move the cut cane to a desired point of discharge without disturbing its tangled interlocked condition.

The particular embodiment of the invention herein illustrated and described is constructed of such scrap material as was available during the war period and weighs approximately twenty-four tons. Many of the parts of the machine were, therefore, chosen without regard to their possible excess weight or excess strength and specific shape, but by making such changes in structural parts as would suggest themselves to a mechanic skilled in the art, the weight of the machine can be substantially reduced and parts of the construction improved. However, the weight preferably should not be reduced a material amount as it is deemed necessary that the machine possess substantial weight to satisfactorily perform its intended work.

One of the primary features of the invention consists in providing a sugar cane harvesting machine with cutters for freeing a swath of cane from the ground and from cane at the side of the swath and in further providing a rearwardly and upwardly extending incline to which the cut cane is transferred and elevated during the forward advance of the machine without disturbing the tangled interlocked condition thereof.

Another feature of the invention consists in providing the upwardly and rearwardly extending incline of the harvesting machine with movable mechanism for preventing the cut cane from sliding back down the incline to thereby insure its elevation as the machine continues to advance.

A further feature of the invention consists in providing the harvester with horizontal reciprocating cutters adapted to cut cane stalks close to the ground and thus form a compact roadway for the machine in its forward movement, the cutters reciprocating at approximately twice the rate of forward movement of the machine so as not to cut more than once in the same place.

A further feature of the invention consists in providing the harvester with side trimmers for cutting cane stalks which are lying on or near the ground in the path of the advancing harvester but out of range of the reciprocating or other ground cutters so that cane growing in rows adjacent to those being cut will not be pulled out of the ground or crushed by the machine and the cane growing in the rows being cut but interlocked with uncut cane at one side of the machine will not interfere with free movement of the tangled mass of cane relatively to the upwardly extending incline.

A still further feature of the invention consists in providing the harvester adjacent the reciprocating cutters with revolving lifters which, in addition to preventing the cut cane from pushing ahead of the harvester, keep the reciprocating cutters clear of the cut cane stalks and evenly transfer the blanket of cut cane from the ground to an upwardly and rearwardly extending incline.

Still another feature of the invention consists in providing the harvester with an improved structure which inclines upwardly and rearwardly from the cutting members and is provided with movable means adapted to engage the cut cane to prevent it from moving back down the incline, the horizontal component of speed of the movable means being substantially equal to the speed of advance of the harvester.

A still further feature of the invention consists in providing novel means whereby the conveyer structure which functions to hold the cut cane to insure its advance up the incline as the machine moves forward and the reciprocating cutters may be either simultaneously or independently moved to an operative position.

Other and more specific features of the invention, residing in advantageous forms, combinations and relations of parts, will hereinafter appear and be pointed out in the claims.

In the drawings, illustrating the preferred embodiment of the invention:

Figure 1 is a substantially diagrammatic side elevational view of the harvester.

Figure 2 is a substantially diagrammatic side elevational view of the harvester similar to Figure 1 but showing the cutter unit and conveyer structure in elevated and inoperative positions.

Figure 3 is a substantially diagrammatic side elevational view of the opposite side of the machine, the cutter unit and conveyer structure being in the position shown in Figure 2.

Figure 4 is a substantially diagrammatic plan view of the machine.

Figure 5 is a front end view of the lower part of the machine.

Figure 6 is an enlarged side elevational view of the front half of the harvester.

Figure 7 is an enlarged side elevational view of most of the rear half of the harvester.

Figure 8 is an enlarged top view of the forward portion of the cutter unit of the harvester, the conveyer structure being omitted.

Figure 9 is a continuation of Figure 8 and is a top view of the remainder of the cutter unit and of the forward portion of the rigid frame of the harvester, the conveyer structure being removed.

Figure 10 is a continuation of Figure 9 and is a top view of the harvester with the conveyer structure being removed.

Figure 11 is an enlarged transverse sectional view taken on line 11—11 of Figure 3.

Figure 12 is a transverse sectional view of the lifter device and the attached transfer plate.

Figure 13 is a detail transverse sectional view through the disk for actuating the side trimmers.

Figure 14 is a fragmentary perspective view of a portion of the conveying apparatus.

Figure 15 is an enlarged fragmentary side elevational view of the mechanism for arresting opening movement of the hopper gate.

Figure 16 is a transverse sectional view taken on line 16—16 of Figure 6.

In the drawings, 1 indicates the rigid frame of the harvester on which is pivotally mounted a cutter unit 2 and an upwardly and rearwardly inclined structure 3. The rigid frame is preferably rotatably mounted upon a travelling base 4 (Figure 7) having two endless tracks 5. With the rigid frame and the operating parts which are mounted thereon being pivotally connected to the travelling base, they may be swung entirely around with respect to the base so that the harvester may operate in either direction without the necessity of turning the base around. The contour of the ground which is laid out for irrigation as well as for growth of cane is, therefore, not needlessly disturbed and the cane plants themselves remain substantially unharmed in the area of the field where the direction of movement of the harvester is reversed.

The cutter unit 2 comprises two identical cutting devices 6 and corresponding parts of each are, therefore, designated by the same reference numerals. Each cutting device includes a pair of side frame members respectively having upper and lower longitudinally extending members 7 and 8, preferably of angle shape. The angles of each frame may be advantageously connected at their inner ends by upright box-like channnels 9 and adjacent their outer ends by a plurality of upright angles 11. The channels 9 of each frame may advantageously be connected by similarly shaped transverse channels 9a and the upright angles 11 may be connected by plates 10.

Each cutter frame is provided with a pair of rearwardly extending members 12 by which it is hingedly connected to a transverse shaft 13 mounted in brackets 14 rigid with and projecting forwardly from the frame 1. As seen in Figure 9, the axes of the two shafts of the cutting devices are concentrically disposed so that they may swing as a unit in a vertical direction.

Each of the cutting devices is also provided with a pair of oppositely arranged channels 15 supported by auxiliary angles 11a connected to the transverse plates 10 affording a support on which a cross head 16 is slidable (Figure 8). If desired, the cross head may be of built up construction, as shown in Figure 16, consisting of upper and lower plates 17 connected by angles to side plates 18. Secured to the outer faces of the side plates 18 are blocks or the like 19 constituting ribs which fit within the channels 15 and thus serve to slidably support the cross head.

Depending from and rigidly connected to the cross head is a support 20 for tubular members 21 which are adapted to receive arms 22 having a cutting blade 23 attached to their forward ends. As shown in Figure 16, the support for the tubular members may conveniently consist of a top plate 24, depending side plates 25 and braces 26. The tubular members 21 which are preferably slotted from one end to the other may be secured to the lower ends of the side plates 25 by welding (Figure 16).

The arms 22 which carry the cutting blade 23 at their outer ends and extend into the tubular members 21 are each formed with an upstanding reinforcing rib 27 which fits within the slot of the tubular member. At its inner end the rib 27 preferably abuts against a shearing pin 28 which is mounted in a pair of upstanding brackets 29 rigid with the tubular member. Each tubular member is also provided with a second pair of upstanding brackets 30 for receiving a rivet 31 to prevent the tubular member from spreading so that it will at all times continue to exert sufficient frictional hold on the arm 22 to grip it firmly. A suitable spacer or the like 31a may, of course, be interposed between the brackets 30 so that, when they are connected by a rivet, the slot in the tubular member will not be closed up.

By having the inner end of the ribs 27 on the arms 22 abut against shearing pins, the arms and therefore the attached cutter blade may move rearwardly when the blade strikes a large stone or other hard and immovable object (Figure 6). The blades and the parts of the machine with which they are associated are thus prevented from serious damage.

Revolubly mounted in bearings 32 in the outer ends of plates 33 which are rigid with and project forwardly from the frame of each cutting device is a shaft 34 (Figure 8). This shaft may conveniently be square in cross section and on it is mounted a plurality of pronged disks 35 which are maintained in suitably spaced relation by spacers 36. Each disk has a plurality of prongs or arms 35 which because of being located adjacent the cutters serve to lift the cane lying on or near the ground as the harvester advances and thereby enable the reciprocating cutters to act freely. In addition to this function, the pronged disks lift the blanket of cut cane and transfer it to the conveyer structure 3. The cut cane is thus prevented from being pushed ahead and accumulating in front of the harvester and interfering with the free operation of the cutting knives.

The space between the cane lifting disks 35 and the upwardly and rearwardly incline structure is bridged by a plate or apron 37 (Figure 12) which is supported at its forward edge by bushings 38 encircling shaft 34 and which, in the present embodiment of the invention, is adapted to rest at its rear edge upon the floor 39 of the upwardly and rearwardly incline structure 3. The forward portion of the transfer plate is formed with a plurality of notches through which the prongs or arms of the lifters may pass. These notches are preferably undercut, as shown in Figure 8, because successive prongs on the disks are bent in opposite directions so that each disk will be self-cleaning and trash in the cane field will not clog the spaces between the prongs.

The cane lifting edge of each prong or disk is arched or convexly curved so that portions of the cut tangled cane lifted thereby will not become wedged or otherwise caught between the prongs and the plate 37 and the blanket of cane will pass uninterruptedly to the floor 39. As may be seen from Figure 5, the prongs of the different lifters are not of uniform length but vary in length so as to conform to the contour of the ground and thus not dig into any part of the furrow. In Hawaii and similar places, the sugar cane grows in the furrows and not in the ground mounded between them and for this reason the diameter of the disks which are just to the rear of the reciprocating cutters is the greatest. The cross head 16 of each cutting device may be reciprocated by any suitable means, such, for example, as a crank shaft 40 which is mounted in a housing 41 supported by the transverse channels 9a. The crank shaft may be provided with an arm 42 (Figure 6) having a pin or trunnion 43 at its outer end for cooperating with a yoke 44 which may be rigidly connected to the cross head by a pair of plates 16a. With a construction of this character the cutter blades can move back and forth a distance of about fourteen inches.

Crank shaft 40 may be advantageously provided with a sprocket which may be rotated by a chain 45 driven by a sprocket mounted on shaft 13. Shaft 13 is also preferably provided at its inner end with an additional sprocket for driving a sprocket chain 46 for rotating a shaft 47 mounted in the forward end of the cutting device. From the shafts 47 of the two cutting devices, motion is imparted by sprocket chains 48 to shaft 34 having the disks 35.

The structure 3, which is sometimes called a conveyer for lack of a better name, is pivotally connected adjacent its inner or upper end to the frame of the harvester by a transverse shaft 49 which may be conveniently supported at opposite ends in uprights 50 rigid with the frame (Figure 2). Stop member 51a, shown in dotted lines in Figure 6, rigid with the frame are preferably secured to and project inwardly from upright members 51, also rigid with the frame, for limiting downward movement of the forward end of the conveyer.

The incline structure 3 includes two side frames each of which may advantageously consist of upper and lower angles 53 and 54 respectively, a pair of intermediate angles 55 and side wall plate 56 to which the bottom and intermediate angles are secured (Figure 11). The upper angle 53 which is spaced above the upper edge of the adjacent side wall plate 56 is connected thereto by a plurality of suitably arranged relatively inclined angular members 57. The two side frames of the structure may be rigidly connected together by the floor plate 39 secured to the bottom angles 54 and a plurality of inclined braces or struts 58 which extend inwardly from the frame and are connected at their inner ends by a truss-like member 59 having upper and lower angles 60.

Movable within the inclined chute thus formed is mechanism comprising (Figure 14) a plurality of endless chains 61 which pass around sprockets carried by shafts 62 and 63 respectively mounted at opposite ends of the incline structure. Carried by substantially triangularly shaped links 64 of the chains 61 and extending from one side of the structure to the other at suitably spaced intervals are a plurality of rods 65 to which arms or fingers 66 are pivotally connected for engaging the blanket of cane delivered to the chute and moving with it as the blanket is forced up the incline during forward advance of the machine.

The arms or fingers 66 may be advantageously arranged in pairs and those of each pair are preferably formed with converging portions 67 which are secured at their free ends to a bushing or sleeve 68 loosely encircling the adjacent rod 65 intermediate the pair of adjoining triangular links 64. Adjacent the outer ends of the portions 67 the arms or fingers 66 are connected by sleeves or bushings 69 to auxiliary rods 70 which are unconnected to the sprocket chains 61. The fingers 66 are, therefore, not rigidly connected to the sprocket chains but instead are movable or hingedly connected to them by the sleeve 68 encircling the rods 65.

At their opposite ends the rods 65 and 70 in the upper reach 61a of the sprocket chains ride along and are supported by the inwardly projecting flanges of the upper angles 53 and intermediate their ends they are supported by the upper angles 60 of the truss 59. As the rods pass from the upper reach of the chain to the lower reach 61b thereof the ends of the rods enter into a guideway formed by the intermediate angles 55 and are supported by the lower one of those angles. Similar guideways are provided at the lower end of the incline structure to prevent the arms or fingers 66 from swinging in an uncontrolled manner with respect to the sprocket chains, the upper members of the guideways at the entrance thereof being inclined upwardly as indicated at 71.

The speed of the fingers 66 is timed with respect to the forward movement of the harvester so that the horizontal component thereof is substantially equal to the forward speed of the machine. The fingers, therefore, act more in the nature of holding fingers, preventing the cut cane from sliding back down the incline than they do as conveying fingers, the force tending to move the cut cane up the incline and thereby elevating it for discharge at the rear of the machine being furnished by the forward movement of the machine itself. The upwardly and rearwardly extending incline, therefore, functions as a wedge moving between the ground and the cut cane as the harvester advances to elevate it to a position where it may be discharged out of the path of movement of the harvester. The construction of the fingers 66 and their pivotal association with the sprocket chains 61 is such that they are capable of readily extending into the tangled mass of cane stalks delivered to the floor 39 of the incline.

With the incline disposed as illustrated in the drawings to elevate the cane approximately fifteen feet for discharge at the rear of the machine, it will be necessary for the fingers 66 to move at a rate of about fifty-four feet per minute while the harvester is travelling at about fifty feet per minute. The horizontal component of the speed of movement of the fingers will, therefore, approximately equal the forward speed of the harvester. Thus the fingers will not pull at the cut cane nor will they interfere with free delivery of it to the incline and, since they move at the same effective speed as the speed of the machine, they will merely move with the cane as it is forced up the incline by the harvester moving forwardly and prevent it from sliding back. It is at once apparent that the relative speed of the fingers 66 with respect to the speed of forward movement of the machine is dependent upon the angle of the incline to the horizontal.

The upper end of the floor 39 terminates a substantial distance, five feet for example, short of the adjacent sides of the incline structure so that the cane stalks may drop away from and be free of the fingers 66 before they start to move upwardly to the upper reach of the endless sprocket chain. To prevent upstanding cane from entering the chute a transverse rod 72 is mounted in front of the shaft 62 on a forwardly projecting extension 73 (Figures 1, 2 and 3).

At each side of the incline structure at the forward lower portion thereof is a vertically acting trimming device for cutting cane stalks growing in the furrows being cut which extend laterally of the incline and also for cutting cane stalks growing in adjacent furrows but projecting into the path of the harvester (Figure 6). A swath of the tangled interlocked cane is, therefore, cut which can be easily transferred to the floor 39. Each of these side trimmers comprises a pair of rearwardly converging blades 74 and a double edged knife 75 which is pivotally mounted so as to coact with each blade. Rigid with the knife is an arm 76 which is connected by a link 77 to trunnion or pin 78 of a crank disk 79 mounted on the adjacent end of the shaft 62 at the forward end of the conveyer. The pin or trunnion 68 being eccentric with respect to the shaft 62 imparts, through the link 77 and arm 76, an oscillating motion to the knife 75 whereby it is caused to successively coact with the blades 74.

Each crank disk 79 is preferably connected to the shaft 62 by a shearing pin 80 so as to prevent damage to the connected side trimming device should a hard foreign object find its way into the path of movement of the knife 75 (Figure 13). This connection between the crank disk 79 and the shaft 62 may be conveniently accomplished by rigidly providing each end of the shaft 62 with a collar 81 having a flange 82 which may be easily connected to the crank disk by the shearing pin 80.

It will, of course, be appreciated that, as the harvester advances usually only the trimming device on the side of the machine adjacent the cane being cut is operatively effective, since cane has already been cut from the field at the opposite side of the machine where the other trimming device is located. However, while only one trimming device may be operatively cutting cane when the machine travels in one direction, the other trimming device becomes the operative one when the direction of travel of the machine is reversed.

A hopper 83 formed in part by a cage or gate 84 may be conveniently positioned at the rear of frame 1 beneath the rear end of the incline structure 3 so as to receive the cut cane which falls therefrom. The cage is rigidly fitted with laterally projecting shafts 85 rotatably mounted in suitable bearings carried by the harvester frame and it may be formed of sections of pipe 86 on which is arranged a plate or the like 87. The gate is adapted to be swung upwardly periodically so as to permit the cane within the hopper to discharge on the ground in piles. The capacity of the hopper is preferably such that the piles of cut cane will be from twenty to twenty-five feet apart.

It will, of course, be apparent to those skilled in the art that, instead of discharging the cut cane into a hopper and then on the ground, it may be directly deposited on the ground, or it could be loaded directly into trailers or wagons coupled to the harveter which, when fully loaded, could be disconnected from the harvester to take the cane to railway gondola cars which are capable of holding twenty to thirty tons or more.

The mechanism for swinging the gate upwardly to open position is preferably such that it will be automatically rendered inoperative after the gate is swung to a predetermined point and yet will lock or hold the gate in open position while the cane is discharging from the hopper. This mechanism may advantageously comprise sprockets 88 (Figure 2) rigid with shafts 85 around which pass sprocket chains 89 driven by sprockets 90 mounted on opposite ends of a transversely extending shaft 91 suitably supported on the frame of the machine. Mounted on this shaft 91 is a sprocket 92 which is adapted to be operatively connected to the shaft by a clutch 93 (Fig. 10), motion being imparted to the sprocket 92 from a sprocket chain 94. The clutch 93 includes a shifter 95 which is responsive to movement of a lever 96 under the control of the operator of the machine whereby the sprocket 94 may be connected to and disconnected from it and thus control opening movement of the gate 84. The connection between the lever 96 and the clutch shifter 95 consists of a rod 97 pivotally connected to the lever and suitable linkage 98 movably connected to the clutch shifter, the arrangement of these parts being such that, when the rod is moved toward the rear of the machine, as viewed in Figure 3, the shifter is caused to operatively connect the sprocket 92 to shaft 91.

To automatically arrest opening movement of the cage after it has been moved upwardly a sufficient distance to enable the cut cane to completely discharge from the hopper, mechanism responsive to opening movement of the gate is provided for moving the rod 97 and linkage 98 in the opposite direction to disconnect the sprocket 92 from the shaft 91. This mechanism may conveniently consist of a pivotally mounted lever 99 having a pivoted arm 100 which is slidably supported just above one of the sprocket chains 89 in a suitable guide on the upper end of an arm 101 rigid with the machine. The forward end of the pivoted arm 100 is disposed in the path of movement of a member 102 (see Fig. 15) which is secured to and movable with the adjacent sprocket chain 89, the member 102 being so arranged on the chain that it will abut the pivoted arm and move it rearwardly when the chain has moved a sufficient distance to raise the gate 84 to the desired open position. Movement of the pivoted arm 100 by the stop member 102 will cause lever 99 to rotate in a counterclockwise direction as viewed in Figure 3 and during such rotation it engages a bracket 103 rigid with and projecting laterally from the rod 97 whereby the rod and the connected linkage 98 is caused to move in a direction declutching the sprocket 92 from shaft 91. Opening movement of the gate is thereupon arrested. To permit the gate to move downwardly to closed position after the cane has discharged from the hopper, the sprocket chains 89 will move in the opposite direction to restore stop member 102 to its original position and a spring 104 is preferably employed to return the pivoted lever 99 and its pivoted arm 100 to their original positions.

To prevent the gate 84 from immediately returning to closed position when upward movement thereof if arrested, detents 105 are pivotally mounted on opposite sides of the hopper for respectively cooperating with locking plates 106 mounted on the ends of the shafts 85 on which the gate is rotatably supported (Figures 1, 2 and 3). Each detent has a pair of arms 107 and 108 and each is normally maintained by a spring 109 in a position such that its arm 107 is disposed in the path of movement of the associated locking plate 106. The locking plates 106 are respectively formed with recesses which are so arranged that at the instant the sprocket 92 is declutched from the shaft 91 and the gate is therefore free to move back to closed position, the arms 107 of the detents will project into the recesses in the locking plates and thus hold shaft 85 from rotating in a direction enabling the gate to move to closed position.

To release the detents from the locking plates to permit the gate to fall by gravity to closed position, the arms 108 of each detent are connected by rods 110 to levers 111 rigidly mounted upon a shaft 112 which extends from one side of the harvester to the other and is journaled in suitable brackets 113. The lever 111 on one side of the machine is connected by a rod 114 to a lever 115 which may be easily actuated by the operator of the machine for rotating the detents 105 in a direction which will move their arms 107 from engagement with the locking plates 106 and thus enable the gate 84 to move to closed position.

To raise the forward end of the incline structure, a pair of substantially triangularly shaped plates 116 may be conveniently pivotally mounted upon a shaft 117 journaled in brackets mounted on the outer ends of members 118 which are rigid with and project forwardly from the central portion of the main frame 1 of the machine between the two devices of the cutting unit (Figure 6). Pivotally connected to the triangular plates 116 are a pair of links 119 which extend upwardly and are pivotally connected at their upper ends to brackets 120 rigid with a stiffening member 121 secured to the under side of the floor 39 and extending from one side thereof to the other. Also pivotally connected to the triangular plates 116 is the outer end of a piston 122 of a cylinder 123 which is mounted on the frame of the machine and is adapted to receive fluid under pressure so as to move the piston 122 outwardly and thus cause the triangular plates 116 to rotate about the shaft 117 in a counterclockwise direction, as viewed in Figure 6. This movement of the triangular plates will move the links 119 upwardly and, therefore, cause the forward end of the incline structure to move upwardly about the shaft 49 on which it is pivotally supported adjacent its upper end.

It is frequently desirable, as when the harvester is to be rotated about its travelling base or when it is to be moved from one field to another, to raise the forward end of the cutting unit 2 at the same time the forward end of the incline structure is raised. For this purpose, the cutting device may be advantageously provided adjacent its rear end with a pair of upstanding rigid arms 124 having rollers or the like 125 at their upper ends which are slidable within slots 126 in members 127 mounted on the sides of the incline structure (Figure 6). With the members 127 held immovable with respect to the incline structure, it will be readily seen that, when the forward end of the incline is raised, the forward end of the cutting unit will also be raised, the unit rotating as a whole about shaft 13 by which it is pivotally connected to the frame of the machine.

While the members 127 must be held immovable with respect to the incline structure when it is desired to have the cutting unit move upwardly simultaneously therewith, the members 127 are nevertheless pivotally mounted at their lower ends on pins 128 so that the cutting unit may be moved and adjusted independently of the incline. By rotating the members 127 about their pins 128, it will be readily perceived that the rollers 125 carried by the arms 124 which are rigid with the cutting unit are caused to move and consequently the entire cutting unit is caused to rotate about the shaft 13 by which it is pivotally connected to the frame 1.

To move the members 127 and thus adjust the cutting unit independently of the conveyer structure a pair of simultaneously operable fluid pressure means each consisting of a cylinder 129 and a piston 130 may be conveniently employed (Figure 6). The outer end of each piston is pivotally connected to the associated member 127 and each cylinder is itself pivotally connected to brackets 131 secured to opposite sides of the incline structure.

The motive power for operating all of the mechanism heretofore described, as well as for propelling the harvester, is supplied by an engine 132 mounted upon the harvester frame. Connected to the engine by a clutch 133 is a main drive shaft 134 supported in bearings 135 (Figure 10). At the outer end of the main drive shaft is a pinion 136 for driving a "silent" chain 137 which passes around a pinion 138 mounted on the outer end of a shaft 139 which drives a transmission device 140 provided with three outlets. As hereinafter described one outlet has but one speed and one motion and is for turning the harvester frame on the travelling base. A second outlet which preferably has two speed changes and two motions is for driving the travelling base. The third outlet actuates the cutting mechanism as well as the conveyer and has two speed changes and one motion.

The outlet for rotating the frame and the harvesting mechanism carried thereby with respect to the travelling base 4, consists in extending shaft 139 through the transmission 140 where it is connected by a coupling 141 to a shaft 142 supported in bearings 143 (Figure 10). Through a sprocket chain 144, shaft 142 drives a clutch device 145 which is connected to a worm reduction gear 146 connected with the upper end of a vertical shaft 147 supported in bearing 148. On the lower end of shaft 147 is a pinion 149 which meshes with a ring gear 150 rigid with the travelling base and concentric with the center pin 151 which rotatably connects the rigid frame of the machine and the travelling base. The base of the frame is rotatably supported on the travelling base by two sets of rollers 152 and 153, the inner set of rollers 152 being movable along a circular track on the upper side of the ring gear 150 and the outer set of rollers 153 being movable along a trackway 154 rigidly mounted on the travelling base adjacent opposite ends thereof.

Connected to the shifter of clutch 145 is a rod 155, a fragmentary portion of which is shown in Figure 10, which may be connected to any suitable means such as a bell crank, like that hereinafter identified by the numeral 203, so that the operation of the clutch may be easily effected to enable the harvesting mechanism to be rotated with respect to the travelling base whenever desired.

The second outlet of the transmission device 140 for driving the endless tracks 5 of the travelling base to propel the harvester may advantageously consist of a shaft 156 coupled at one end to a shaft 157 which is driven through a pair of miter or bevel gears by one of the outlets of the transmission 140 (Figure 10). At its other end, the shaft 156 is coupled to a shaft 158 which is mounted in a suitable bearing and through a pair of bevel or miter gears imparts rotation to a vertically arranged shaft 159. Rigid with shaft 159 is a pinion 160 which meshes with a pinion 161 keyed to a vertical shaft 162 which is mounted within the center pin 151.

At its lower end shaft 162 is provided with a miter gear 163 which meshes with a similar gear 164 mounted on one end of a main drive shaft 165 of the travelling base (Figure 7). Extending transversely of the base at the end of the drive shaft 165 is a shaft 166 on which is rigidly mounted ring gear 166a. Adjacent opposite ends of shaft 166 are sprocket wheels 167 which may be selectively and simultaneously locked to or rendered free of the shaft by clutches 167a. Passing around the sprocket wheels 167 are sprockets 168 which also pass around sprocket wheels 169 on shafts 170. One of the shafts 170 is connected by chain and sprocket 171 to one of the endless tracks 5 and the other of the shafts is connected by chain and sprocket to the other endless track. By suitable operation of the clutches 167a the shafts 170 may be driven at the same or at different speeds. When driven at the same speeds both endless tracks are caused to move at the same speed and the travelling base will, therefore, move in a straight line but, when driven at different speeds, the endless tracks will also move at different speeds and the travelling base will, therefore, turn. This mechanism for driving the shafts at the same or at different speeds is identical at both ends of shaft 166 and, as it forms no part of the invention of this application, only one of the two identical clutch and sprocket constructions is shown in Figure 7 of the drawings.

The reciprocating cutters and the rotatable lifting disks receive their motion from a shaft 172 which is driven by a transmission shaft 173 through a pair of bevel or miter gears 174, the shaft 173 constituting the third outlet of the transmission device 140 (Figure 10). Coupled to shaft 172 is a shaft 175 supported in bearings 176 and provided at its forward end with a clutch 177. By means of this clutch, shaft 175 is adapted to be connected with and disconnected from a shaft 178 having a bevel gear 179 which meshes with a bevel gear 180 mounted on a shaft 181 which extends from one side of the harvester frame to the other at the forward end thereof, being supported in bearings 182 (Figure 9). At each end the shaft 181 is connected by suitable chain and sprocket mechanism 183 to the shafts 13 of the cutting devices 6, from which, as heretofore explained, the reciprocating cutting blades 23 and the shafts 34 having the lifting disks 35 are driven. The clutch 177 for operatively connecting shaft 175 with shaft 181 may, of course, be operated by any suitable connection (not shown) to a lever 184 under the control of the operator of the machine.

To drive the sprocket chain apparatus having the fingers 66, shaft 172 is provided with a sprocket wheel 185 for driving a sprocket chain 186 which cooperates with a sprocket mounted upon a jack shaft 187 (Figure 10). Through a pair of bevel gears, shaft 187 is rotatably connected to shaft 188 which is provided at its outer end with a clutch 189 whereby a sprocket 190 mounted on shaft 188 may be connected thereto or disconnected therefrom. By a chain 191, sprocket 190 is adapted to drive sprocket 192 having a hub which is revolubly mounted on one end of shaft 49 by which the conveyer is pivotally connected to the frame of the machine. Rigid with this hub is another and smaller sprocket 193 which through a chain 194 and a sprocket 195 drives the shaft 63 at the upper and rear end of the incline structure around which the endless sprocket chains 61 pass. Movement of the clutch 189 whereby the conveying mechanism may be set in operation or stopped may be effected by any kind of connection with a lever 196 which is located so as to be under the control of the operator of the machine. The motion which is imparted to the sprocket chains which carry the fingers 66 is, as explained heretofore, so timed with respect to the forward movement of the harvester that the horizontal component of the speed of the fingers is approximately equal to the forward speed of the machine.

Movement is imparted to the sprocket chain 94 which, as stated, rotates shaft 91 to raise the gate 84 of the hopper 83, from a sprocket 197 mounted on shaft 175 through a chain 198, a bevel gear assembly mounted within a housing 199 and a sprocket 200 which cooperates with the chain 94 (Figure 7).

The transmission 140 is provided with conventional means (not shown) whereby the shafts 156 and 172 which respectively actuate the propelling mechanism of the travelling base and of the cutting mechanism and the arms 66, may be selectively and simultaneously driven at two different speeds (Figure 10). This means within the transmission may be actuated by a shifter 201 which is connected by rod 202, bell crank lever 203 and rod 204 to a lever 205 which is conveniently mounted so as to be under the control of the operator of the machine. When this lever is moved in one direction the shifter 201 is actuated to simultaneously increase the speeds of shafts 156 and 172, and when the lever is moved in the opposite direction the shifter is actuated to simultaneously decrease the speeds of those shafts. Irrespective of the speeds of the shafts, however, the same timed relationship heretofore explained is maintained so that the horizontal component of the speed of the conveyer will always remain approximately equal to the forward speed of the machine.

The transmission is provided with still other well known means (not shown) adapted to be actuated by a shifter 206 to reverse the direction of rotation of the shaft 156 and thus reverse the direction of movement of the travelling base. The shifter 206 may be conveniently connected by rod 207, bell crank lever 208 and rod 209 to lever 210 pivotally mounted so as to be easily operable by the operator of the machine.

The means for supplying fluid pressure to the cylinder 123 for actuating the piston 122 for elevating the forward end of the inclined chute may conveniently consist of an oil pump 211 which is connected to an oil tank 212 by a suction pipe 213 (Figure 7). The pump 211 may be conveniently driven from the main drive shaft 134 of the apparatus by a chain and sprocket connection 214.

Oil from the pump 211 passes through a pipe 215 to a control valve 216, fragmentary portions of which are shown in Figure 7. This valve is connected to the oil tank by a pipe 217 and to the rear end of cylinder 123 by a pipe 218. By having the valve connected with the oil tank, it is possible for the pump 211 to run continuously. When the valve 216 is adjusted so that the oil under pressure enters the rear of cylinder 123, the piston therein on the piston rod 122 is caused to move ahead and by the means heretofore described raise the forward end of the incline structure.

To adjust the cutting unit 2 with respect to the ground independently of the incline structure, fluid under pressure may be supplied to the cylinder 219 for operating piston 130 from a hydraulic pump 219 which may be conveniently operated from the shaft 142 by a chain and sprocket 220 (Figure 10). The pump is connected by a suction pipe 221 to an oil tank 222 and is connected by a discharge pipe 223 to a control valve 224 (see Figures 9 and 10).

Leading from the control valve to the rear end of the cylinder 129 is a pipe 225 and leading to the front end of the cylinder from the control valve is a pipe 226 (Figure 6). Under normal conditions, fluid under pressure is supplied to the front end of the cylinder and the piston 130 thereof is held in its innermost position by closing valve 224 which, although allowing the oil to flow back to the tank 222 through a pipe 227 nevertheless enables the piston to be subjected to the desired fluid pressure. When it is desired to move the forward end of the cutting unit 2 downwardly with respect to the incline structure, oil under pressure is admitted to the rear end of cylinder 129 through pipe 225 by proper manipulation of control valve 224. Should the cutting device be subjected to excessive strain when being moved downwardly with respect to the chute or incline, a relief valve 228 permits the oil to return to the tank 222. Valve 224, as well as valve 216, may be operated by levers mounted on the side of the harvester within convenient reach of the operator.

With all the various parts cooperating in the manner thus described, the harvester is brought in line with the two rows of cane to be cut preferably initially at one side of the field. The incline structure and the reciprocating cutters are then lowered so that the cutters are disposed about two inches from the ground and the harvester is then set into operation. As the machine moves along the ground the blades 23 reciprocate at about twice the forward speed of the harvester so that they will not cut twice in the same place and while they shear the cane in the two furrows being cut close to the plant stools, one of the side trimmers 75, at least, is operating to shear the cane lying near the ground but extending out of or into the path of movement of the machine.

Shafts 34 revolving so that the convexly curved edges of the lifting prongs 35 engage the cane as described, will lift the cane from the ground to thereby enable the reciprocating cutters to act freely and at the same time they will lift the cut blanket of cane and transfer it on to the floor 39 of the incline structure. The arms 66 of the movable mechanism associated with the incline easily penetrate the tangled interlocked mass of cane and move upwardly with it as the harvester advances to the end of the floor 39 where the cane falls into hopper 83 at the rear of the harvester. When the hopper is filled, the gate 84 is raised upwardly, as described, so as to permit the cut cane to drop in heaped piles on the ground. It will, of course, be appreciated that, should the forward advance of the harvester itself fail to transmit sufficient force to the cut swath of cane to move it up the incline, the arms 66 will then act as conveyor arms to supply the additional force necessary.

These operations are continued until the harvester reaches the end of the furrow being cut. The forward ends of the incline structure and of the cutting device are then raised so as to clear all obstructions and the entire superstructure of the harvester is swung around 180° with respect to the travelling base. With the harvesting mechanism facing in the opposite direction, the travelling base is then maneuvered into a position in line with the next two cane furrows to be cut, and the forward ends of the incline structure and of the device are then lowered and the operations just described repeated.

From the foregoing, it will be perceived that I have devised a machine for harvesting cane which, in addition to being capable of effectively and efficiently performing its intended function, will stand up under the severe service conditions to which such machine are subjected. As shown in the main side views of the machine, many of the sprockets and chains may be enclosed and the sides of the cutting devices may be covered by side plates 229; and the movable mechanism associated with the incline may itself constitute the floor of the incline and operate in the same timed relation with respect to the forward advance of the harvester as herein explained. Various changes and alterations may also be made, as previously indicated, in the particular embodiment of the invention here illustrated and described without departing from the spirit and scope of the invention as defined in the appended claims.

What I claim is:

1. A machine for harvesting cane growing in a tangled condition, said machine being provided at its forward end with a plurality of cutting means, one of said cutting means operating in a position to sever the tangled cane from the ground and the other of said cutting means being positioned at the sides of said machine close to the ground to sever the cane freed from the ground from cane growing into the path of forward movement of said machine to thereby form a swath of tangled cane, an upwardly and rearwardly extending incline to receive said swath of tangled cane, and means cooperating with said incline to insure movement of said swath along said incline as the machine moves forwardly.

2. A machine for harvesting cane growing in a tangled condition, said machine being provided at its forward end with a plurality of cutting means, one of said cutting means operating in a position to sever the tangled cane from the ground and the other of said cutting means being positioned at the sides of said machine to sever the tangled cane cut from the ground from cane growing into the path of forward movement of said machine to thereby form a swath of the tangled cane, an incline structure extending upwardly and rearwardly from said cutting means including a floor to which the swath of tangled cane is delivered, and endless mechanism for engaging the tangled swath of cane delivered to said floor and for moving with it as the tangled cane is advanced along the floor by the forward movement of the machine, the horizontal component of the speed of the endless mechanism being substantially equal to the speed of the forward movement of the harvester.

3. A machine for harvesting cane growing in a tangled condition including a rigid frame, cutter members providing a unit pivotally associated with said frame and provided with a plurality of cutting members, an incline structure extending upwardly and rearwardly from adjacent said cutting members, and rotatable means extending transversely of the machine rearwardly of said cutting members for transferring the cut tangled cane onto said incline in an undisturbed condition.

4. A machine for harvesting cane growing in a tangled condition including a cutter unit mounted at the forward end of said machine and provided with reciprocating cutting members movable substantially in the direction of normal movement of the machine close to the ground, an incline structure mounted on said machine and extending upwardly and rearwardly from adjacent the cutting members, and a rotatable shaft extending transversely of the machine adjacent the cutting members, said shaft having a plurality of prongs rearwardly of said cutting members for transferring the cut tangled cane to the forward end of said structure in an undisturbed condition, and the lifting side of each of said prongs being convexly curved.

5. A machine for harvesting cane growing in a tangled condition including a rigid frame, a cutter unit mounted adjacent the forward end of said machine provided with a plurality of cutting members positioned close to the ground, an incline structure mounted on said frame extending upwardly and rearwardly from adjacent said cutting members, said structure having a floor and an endless conveying device for engaging cane cut by said members, said endless conveying device being movable along the floor from one end thereof to the other as the machine advances, and rotatable means extending transversely of said cutter unit rearwardly of said cutting members, said means being provided with a plurality of prongs for feeding said cut cane to said floor.

6. A machine for harvesting cane in a tangled condition including a rigid frame, a cutter unit pivotally connected on a substantially horizontal axis to the forward end of said frame provided with movable cutting members, an incline structure extending upwardly and rearwardly from adjacent said cutting members and pivotally connected adjacent the upper end thereof to said frame, said structure having means engageable with said tangled cane cut by said members and movable at a rate slightly faster than the forward movement of the machine to convey said tangled cane rearwardly in an undisturbed condition, and trimming devices involving vertically movable knives respectively mounted on opposite sides of said incline adjacent the forward edge thereof.

7. A cane harvesting machine including a rigid frame, a cutter unit at the forward end of said machine provided with reciprocating cutting members movable substantially horizontally in the direction of normal movement of the machine, an incline structure mounted on said frame and extending upwardly and rearwardly from adjacent said cutting members, trimming devices positioned close to the ground respectively arranged adjacent opposite sides of said cutting unit and respectively having vertically movable pivoted knives, and means for delivering cane cut by said cutting members and said trimming devices to the incline structure, said means including a rotatable shaft extending transversely of said cutter unit provided with a plurality of prongs adapted to lift the cut cane and advance it toward said structure, each of said prongs being convexly curved on its lifting edge.

8. A cane harvesting machine including a rigid frame, a cutter unit extending forwardly of said machine provided with a plurality of cutting members, an incline structure mounted on said frame and extending upwardly and rearwardly from adjacent said cutting members, said structure having a floor and an endless chain device for moving with cut cane along said floor as the machine advances, and means mounted on said cutter unit in advance of said incline structure for lifting the cut cane and advancing it toward said floor, said means including a rotatable shaft extending transversely of the cutter unit, prongs rigid with said shaft for lifting the cut cane, the lifting edge of each prong being convexly curved, and an apron bridging the space between said shaft and said floor having a plurality of notches for receiving said prongs.

9. A machine for harvesting cane growing in a tangled condition including a rigid frame, a cutter unit extending forwardly of said machine provided with a plurality of members for cutting the tangled cane, an incline structure mounted on said frame and extending upwardly and rearwardly from adjacent said cutting members, said structure having a floor and an endless chain device for moving with cut cane along the floor in an undisturbed condition from one end thereof to the other during the forward advance of the machine, a transversely extending rotatable shaft mounted on said cutter unit adjacent the rear of said cutting members, a plurality of laterally spaced disks mounted on said shaft respectively provided with prongs for lifting the tangled cut cane and advancing it toward said floor, the lifting edge of each of said prongs being convexly curved, and an inclined apron mounted on the cutter unit for bridging the space between said shaft and said floor.

10. A machine for harvesting cane growing in a tangled condition including a rigid frame, a cutter unit pivotally connected to adjacent the forward end of said frame provided with cutting members adapted to be disposed adjacent the ground for cutting the tangled cane, an incline structure extending upwardly and rearwardly from adjacent said cutting members and pivotally connected adjacent the upper end thereof to said frame whereby the forward end of the incline may be adjusted vertically with respect to the ground, and means movably connecting said cutter unit to said incline structure so that vertical adjustment of the forward end of said structure with respect to the ground will effect a vertical adjustment of the forward end of the cutter unit with respect to the ground.

11. A cane harvesting machine including a rigid frame, a cutter unit pivotally connected to adjacent the forward end of said frame provided with cutting members, an incline structure extending upwardly and rearwardly from said cutting members and pivotally connected adjacent the upper end thereof to said frame whereby the forward end of the incline may be adjusted vertically with respect to the ground, means movably connecting said cutter unit and said incline structure so that vertical adjustment of the forward end of the incline structure with respect to the ground will effect a vertical adjustment of the cutter unit, and means for effecting vertical adjustment of the forward end of the cutter unit with respect to the ground independently of adjustment of the incline structure.

12. A machine for harvesting cane growing in a tangled condition including a cutter unit mounted at the forward end of said machine having a plurality of members for cutting the tangled cane, incline means extending upwardly and rearwardly from adjacent the cutting members, said means having substantially upright walls and a floor whose forward end is disposed adjacent the inner ends of said members, vertically movable knives close to the ground pivotally mounted on the side walls of said means adjacent opposite sides of the cutting members, and an endless device movable above said members into engagement with cut cane delivered to said floor for moving with it as it is advanced along said floor by forward movement of the machine.

13. A cane harvesting machine including a cutter unit mounted at the forward end of said machine provided with a plurality of cutting members reciprocating in a direction of movement of the machine, incline means extending upwardly and rearwardly from adjacent the cutting members having a floor and side walls, a hopper beneath the rear end of said means, said floor having its front end disposed inwardly of said cutting members and its rear end disposed above said hopper inwardly of the adjacent ends of said side walls, and an endless device movable with the cane cut by said members as it is advanced along said floor by the forward movement of the machine, said device being movable downwardly above the cutting members in advance of the front end of the floor into engagement with the cut cane and being movable beyond the rear end of the floor above the hopper to permit the cut cane to drop free therefrom into said hopper.

14. A machine for harvesting cane growing in a tangled condition including a rigid frame, a cutter unit pivotally connected to adjacent the forward end of said frame provided with reciprocating cutting members movable substantially horizontally in the direction of normal movement of said machine for cutting said tangled cane from the ground, means for vertically adjusting the forward end of the cutter unit with respect to the ground, an incline structure extending upwardly and rearwardly from adjacent said cutting members and pivotally connected to said frame independently of the cutter unit so that the forward end of the structure may be adjusted with respect to the ground, said structure having an endless chain device for engaging cut cane delivered thereto and for moving with the cane as it is forced to travel up said incline by the forward advance of the machine, and trimming devices respectively mounted on opposite sides of said cutter unit for severing the tangled cane cut from the ground from cane growing into the path of the advancing machine, each trimming device comprising a pair of rearwardly converging stationary blades, a double edged knife pivotally mounted adjacent the inner ends of said blades for alternatively cooperating therewith, an arm rigid with said knife, and means connected to said arm and operable upon movement of said endless chain for actuating said knife.

15. A machine for harvesting cane growing in a tangled condition including a rigid frame, a cutter unit pivotally connected to adjacent the forward end of said frame provided with reciprocating cutting members movable substantially horizontally in the direction in which the machine is normally adapted to move to cut the tangled cane from the ground, means for actuating said cutting members to cause them to move at a rate approximately twice the rate of the forward movement of the machine whereby the cutting members will not cut more than once in the same place, cutting means at the side of the machine for freeing the cane cut from the ground from cane growing into the path of the advancing machine, an incline structure extending upwardly and rearwardly from adjacent said cutting members for receiving the cut cane and discharging it at the rear of said frame, said structure being pivotally connected to said frame adjacent the rear thereof so that its forward end may be adjusted vertically with respect to the ground, and means for effecting vertical adjustment of the forward end of the cutter unit with respect to the ground independently of adjustment of the conveyer.

16. A cane harvesting machine including a rigid frame, a cutter unit pivotally connected to adjacent the forward end of said frame provided with a plurality of cutting members, an incline structure extending upwardly and rearwardly from adjacent said cutting members and pivotally connected to said frame whereby the forward end of the said structure may be adjusted vertically with respect to the ground, inclined guide members mounted on opposite sides of said structure, arms rigid with said cutter unit for respectively cooperating with said guide members whereby vertical adjustment of the forward end of said structure will effect corresponding adjustment of the forward end of the cutter unit, and fluid pressure operated means mounted on said frame and movably connected to said structure for vertically adjusting the forward end of the latter.

17. A machine for harvesting cane growing in a tangled condition including a rigid frame, a cutter unit pivotally connected to adjacent the forward end of said frame provided with a plurality of members for cutting said tangled cane, an incline structure extending upwardly and rearwardly from adjacent said cutting members and pivotally connected to said frame whereby the forward end of said structure may be adjusted vertically with respect to the ground, means movably connecting said cutter unit and said structure so that vertical adjustment of the forward end of said structure will simultaneously effect a corresponding adjustment of the forward end of the cutter unit, said means including inclined guide members arranged on opposite sides of said incline structure and arms rigidly mounted on said cutter unit and slidably cooperable with said guide members, and means for adjusting the forward end of the cutter unit with respect to the forward end of said structure.

18. A machine for harvesting cane growing in a tangled condition including a rigid frame, a vertically adjustable cutter unit mounted on the forward end of said frame provided with a plurality of members for cutting the tangled cane, and an incline structure extending upwardly and rearwardly from adjacent said cutting members and pivotally connected to said frame so that its forward end may be adjusted vertically with respect to the ground, said structure comprising a floor having its forward edge adjacent the inner ends of the cutting members, a plurality of endless chains, transversely extending rods respectively connected to said chains and movable therewith, auxiliary transverse rods arranged in spaced relation to said first named rods and pivotally connected thereto, cane engaging arms rigid with said auxiliary rods movable downwardly above said cutting members into engagement with the tangled cane cut thereby for moving with the tangled cut cane as it is advanced along said floor by forward movement of the machine, and means arranged on opposite sides of said incline structure for supporting the ends of each of said rods.

19. A machine for harvesting cane growing in a tangled condition including a cutter unit mounted at the forward end of said machine provided with a plurality of members for cutting the tangled cane, and an incline structure extending upwardly and rearwardly from adjacent said cutting members having a floor portion adjacent the inner end of the cutting members, said structure including a plurality of endless chains, a plurality of transversely extending rods respectively having a plurality of rigid arms movable above said cutting members into engagement with the cane cut thereby for moving with the cut cane as it is advanced along said floor by forward movement of the machine, each of said arms being rigidly provided at its inner end with a forwardly projecting portion for hingedly connecting the associated rod to said chains at points in advance of said rod, and means affording guideways for said rods.

20. A machine for harvesting cane growing in a tangled condition including a cutter unit mounted at the forward end of said machine and provided with a plurality of members for cutting said tangled cane, an inclined chute extending upwardly and rearwardly from adjacent the cutting members, said chute having a floor and substantially upright side walls, an endless device above said floor movable into engagement with the cut cane delivered to the floor, and a transverse bar positioned in advance of said endless device to prevent uncut cane from entering said chute.

THOMAS A. GUILD.

REFERENCES CITED

The following references are of record in the file of this patent:

UNITED STATES PATENTS

| Number | Name | Date |
|---|---|---|
| 112,579 | Fuller | Mar. 14, 1871 |
| 724,345 | Sloane | Mar. 31, 1903 |
| 730,671 | Luce | June 9, 1903 |
| 1,332,495 | Graham | Mar. 2, 1920 |
| 1,459,247 | Pazos | June 19, 1923 |
| 1,648,313 | Luce | Nov. 8, 1927 |
| 1,675,651 | Guild | July 3, 1928 |
| 1,710,611 | Duncan | Apr. 23, 1929 |
| 1,908,966 | Falkiner et al. | May 16, 1933 |
| 1,938,264 | Templeton | Dec. 5, 1933 |
| 2,062,385 | Wilson | Dec. 1, 1936 |
| 2,388,861 | McCann | Nov. 13, 1945 |
| 2,439,259 | McCormack | Apr. 6, 1948 |

FOREIGN PATENTS

| Number | Country | Date |
|---|---|---|
| 486,179 | Great Britain | May 31, 1938 |